(12) United States Patent
Rajanna et al.

(10) Patent No.: US 12,115,994 B2
(45) Date of Patent: Oct. 15, 2024

(54) SYSTEMS AND METHODS FOR OPERATING A VEHICLE BASED ON PHYSIOLOGICAL PARAMETERS OF AN OCCUPANT

(71) Applicant: Rovi Guides, Inc., San Jose, CA (US)

(72) Inventors: VasanthRaj Rajanna, Karnataka (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 73 days.

(21) Appl. No.: 17/399,432

(22) Filed: Aug. 11, 2021

(65) Prior Publication Data

US 2023/0052474 A1 Feb. 16, 2023

(51) Int. Cl.
*B60W 40/08* (2012.01)

(52) U.S. Cl.
CPC ..... *B60W 40/08* (2013.01); *B60W 2040/0872* (2013.01); *B60W 2540/221* (2020.02); *B60W 2710/18* (2013.01); *B60W 2720/106* (2013.01)

(58) Field of Classification Search
None
See application file for complete search history.

(56) References Cited

U.S. PATENT DOCUMENTS

| | | | |
|---|---|---|---|
| 8,949,889 B1 | 2/2015 | Erdmann | |
| 10,528,833 B1 * | 1/2020 | Bhatnagar | B60W 40/08 |
| 11,414,093 B2 * | 8/2022 | Balachandran | A61B 5/14551 |
| 11,428,540 B1 * | 8/2022 | Gray | G01C 21/3461 |
| 2013/0091071 A1 | 4/2013 | Davies | |
| 2015/0319470 A1 | 11/2015 | Tang et al. | |
| 2017/0223411 A1 | 8/2017 | De Juan et al. | |
| 2018/0004211 A1 * | 1/2018 | Grimm | G06Q 10/047 |
| 2018/0286150 A1 * | 10/2018 | Chen | G07C 5/008 |
| 2019/0049959 A1 * | 2/2019 | Gaither | G08G 1/0129 |
| 2019/0057166 A1 * | 2/2019 | Liongosari | B60R 16/037 |
| 2019/0243459 A1 * | 8/2019 | Imaizumi | B60K 35/00 |
| 2019/0337521 A1 * | 11/2019 | Stauber | A61B 5/4803 |
| 2019/0375426 A1 * | 12/2019 | Suga | G06N 5/01 |
| 2019/0386887 A1 * | 12/2019 | Ricci | B60K 37/00 |
| 2019/0391581 A1 * | 12/2019 | Vardaro | A61B 5/02055 |
| 2020/0155054 A1 * | 5/2020 | Slater | A61B 5/7435 |
| 2020/0353934 A1 * | 11/2020 | Vulcu | A61B 5/165 |
| 2021/0009009 A1 | 1/2021 | Geiger et al. | |
| 2021/0107501 A1 * | 4/2021 | Monteil | A61B 5/18 |

(Continued)

FOREIGN PATENT DOCUMENTS

KR 20180120901 A * 11/2018 ............. B60K 28/06

OTHER PUBLICATIONS

PCT International Search Report for International Application No. PCT/US2021/063013, dated May 10, 2022 (13 pages).

*Primary Examiner* — Amelia Vorce
(74) *Attorney, Agent, or Firm* — HALEY GUILIANO LLP

(57) ABSTRACT

The present disclosure provides system and methods for a vehicle infotainment system (VIS) to monitor physiological parameters of occupants of a vehicle. The VIS also monitors vehicle operating parameters. The VIS is able to detect when an occupant is experiencing a physiological condition and correlates the physiological condition to one or more vehicle operating parameters. In response to detecting a physiological condition and to determining the correlation, the VIS causes an action to occur in order to mitigate the physiological condition and/or to seek assistance for the physiological condition.

20 Claims, 6 Drawing Sheets

(56) References Cited

U.S. PATENT DOCUMENTS

| | | | | |
|---|---|---|---|---|
| 2021/0339759 A1* | 11/2021 | Fouad | .................. | A61B 5/1176 |
| 2022/0001893 A1* | 1/2022 | Tartz | .................... | A61B 5/7282 |
| 2022/0001894 A1* | 1/2022 | Yeom | ................ | B60W 60/0013 |
| 2022/0032956 A1* | 2/2022 | Wolff | .................... | B60W 40/08 |
| 2022/0070644 A1* | 3/2022 | Möhlmann | .......... | A61B 5/6893 |
| 2022/0074758 A1* | 3/2022 | Sameer | ............ | G08G 1/096775 |
| 2022/0128422 A1* | 4/2022 | Cech | ....................... | G01L 1/146 |
| 2023/0041487 A1* | 2/2023 | Garcia | .................. | G06Q 50/30 |

\* cited by examiner

SYSTEMS AND METHODS FOR OPERATING A VEHICLE BASED ON PHYSIOLOGICAL PARAMETERS OF AN OCCUPANT

BACKGROUND

The present disclosure is directed to vehicle operation, and more specifically to correlating a physiological condition of an occupant of a vehicle to an operating parameter of the vehicle in order to perform an action to address the physiological condition.

SUMMARY

A method, non-transitory computer readable medium, and system for correlating a physiological condition of an occupant of a vehicle to an operating parameter of the vehicle in order to perform an action to address the physiological condition are described. One or more embodiments of the method, non-transitory computer readable medium, and system include receiving, from at least a sensor operatively coupled to the occupant, information about a physiological parameter of the occupant, determining, using processing circuitry, information about the operating parameter of the vehicle, detecting, using the processing circuitry, the physiological condition of the occupant based on the information about the physiological parameter of the occupant, determining, in response to the detecting the physiological condition, a correlation between the operating parameter of the vehicle and the physiological condition of the occupant, and causing, using the processing circuitry, the action in the vehicle to be performed to address the physiological condition based on the determined correlation.

The system detects the presence of vehicle occupants and is able to monitor respective physiological parameters using, for example, a wearable sensor (e.g., wristband) on each occupant. The physiological parameters can be monitored periodically, continuously, or can be triggered by certain events taking place (e.g., based on certain changes in the vehicle's operating parameters). In some embodiments, vehicle operating parameters are being monitored at or close to the same time as the physiological parameters are being monitored. In some embodiments, vehicle operating parameters can be measured in response to physiological parameters being received, in response to certain changes occurring in the physiological parameters, or both. Changes in vehicle operating parameters can be compared to changes in physiological parameters to correlate the vehicle operating parameters to the physiological parameters of each occupant. The system can detect physiological conditions (e.g., increased respiration, sweating, loss of consciousness) by monitoring the physiological parameters and can correlate a physiological condition to vehicle operating parameters (e.g., speed, windows being closed, etc.) or to changes in vehicle operating parameters. For example, a trained machine learning model can be used to detect correlations between vehicle operating parameters (or changes thereto) and a physiological parameter or physiological condition of an occupant.

A profile for each occupant can be stored either locally (e.g., in a mobile device associated with a respective occupant, in the vehicle, or both) or remotely in, for example, cloud storage. The profile can contain historical physiological information for an occupant, including, for example, any pre-existing physiological conditions, previously recorded physiological parameter readings (either from within the vehicle or from elsewhere), navigation information (e.g., places the user has visited, routes taken), user preference information, any other suitable information, or any combination thereof. As the system monitors an occupant's physiological parameters within the vehicle, the values of the physiological parameters can be stored in the profile, values of vehicle operating parameters can be stored in the profile, information regarding physiological conditions of the occupant that the system detects can be stored in the profile, and information about correlations between physiological conditions or physiological parameters and vehicle operating parameters can be stored in the profile.

A physiological condition can be detected by the system using physiological parameter information obtained in the course of monitoring an occupant of a vehicle either by itself or together with historical physiological information from the occupant's profile. A physiological condition can also be detected by the system using only historical physiological information from the profile. Correlations between the detected physiological condition and vehicle operating parameters can also be determined from information previously stored in the profile, from real-time analysis of physiological parameter data and from real-time vehicle operating parameters. For example, an occupant's profile might indicate that the occupant tends to suffer from an extreme increase in heart rate when routes with steep hills and windy roads are driven in the vehicle. This information can be used by the system to cause the navigation system to select a route that avoids steep hills and windy roads.

The system can cause an appropriate action to be taken upon detection of a physiological condition and a determination of a correlation of the physiological condition to operating parameters of the vehicle. Appropriate actions can take any suitable form, including, for example, causing a change in the environmental conditions within the vehicle's cabin (e.g., opening or closing windows, modifying the heating and cooling settings, modifying parameters of the vehicle's entertainment system, modifying seat positioning, etc.), causing changes to the autonomous operation of the vehicle (e.g., modifying speed, acceleration, or braking patterns, modifying a route to a destination, modifying the destination (e.g., to a hospital or medical facility), modifying driving habits (e.g., to avoid certain movements of the vehicle, to avoid certain terrain, etc.), activating or deactivating an autonomous driving mode, etc.), causing a communication to be transmitted to an appropriate destination (e.g., sending a text message to an emergency contact defined in the occupant profile or to emergency services, etc.), or causing to be performed any other suitable action or combination of actions depending on the nature of the physiological condition and, for example, on any other suitable factors. In some embodiments, the purpose of causing the action to be taken is to modify one or more operating parameters of the vehicle that have been determined to be correlated to the physiological condition of the occupant. The actions may be used to directly or indirectly affect such one or more operating parameters.

When an occupant is detected in the vehicle, the system searches for a profile associated with the occupant. In some embodiments, the system can create a new profile upon detection of an occupant. Detection of an occupant can occur in any suitable way. For example, sensing a weight, using any suitable computer vision technique with an in-cabin camera, detecting a signal from a wearable sensor (e.g., a healthband), can by themselves or in any suitable combination cause the system to detect an occupant.

When there are multiple occupants in the vehicle, the system can use or create separate respective profiles for each occupant. In some embodiment, the system can prioritize the health or comfort of one or more occupants with respect to others. For example, where the system detects physiological conditions for multiple occupants, the system can cause appropriate action to be taken to address the conditions in order of priority. Priority can be defined by severity if the physiological condition, occupant age, occupant overall health, etc. In some suitable approaches, an overall priority weight can be calculated based on any number of suitable factors to determine which occupant's physiological condition takes precedence or which physiological condition of a number of detected physiological conditions for a single occupant takes precedence when deciding which action to cause.

In some embodiments, the system can operate in different modes depending on, for example, whether there is one occupant (e.g., the driver) or multiple occupants. The appropriate mode can be selected by the system by detecting, using any suitable technique, the number of occupants, the location of either occupant, one or more relevant characteristics of each occupant (e.g., weight, age), any other suitable information about the occupants and/or the vehicle, or any combination thereof.

In some embodiments, the locations of respective occupants within a vehicle can be used to determine or otherwise influence the actions to be taken upon detection of a physiological condition for a particular occupant. For example, the location of an occupant suffering from a physiological condition correlated with temperature can be used to direct changes in temperature to the particular location of that occupant (e.g., opening/closing a window closest to that occupant, directing air conditioning vents towards that occupant, etc.).

In some embodiments, the system can communicate with cloud-based resources to determine information not only about the occupants (e.g., through their respective profiles) but also about other vehicles, other occupants of other vehicles, or both. This additional information can be used to further enhance the features of the present disclosure.

In some embodiments, the system of the present disclosure can take into account a vehicle's geographic location in determining actions to take based on, for example, physiological information of occupants in other vehicles. For example, where occupants in other vehicles are experiencing a certain physiological condition to occur at a particular location, which is along a route being taken by the current vehicle, the system in the current vehicle can determine to avoid that particular location and to cause the vehicle's navigation system to find an alternative route.

DETAILED DESCRIPTION

The features of the present disclosure are described herein as being implemented and provided by a vehicle infotainment system (VIS). The VIS can be any suitable software, hardware, or both. While the VIS can be implemented entirely within a vehicle, it will be understood that in some embodiments, the VIS can be at least partially implemented remote to the vehicle as part of a distributed system of processing, storage, or both. The VIS will be more fully discussed below.

Figure 1:
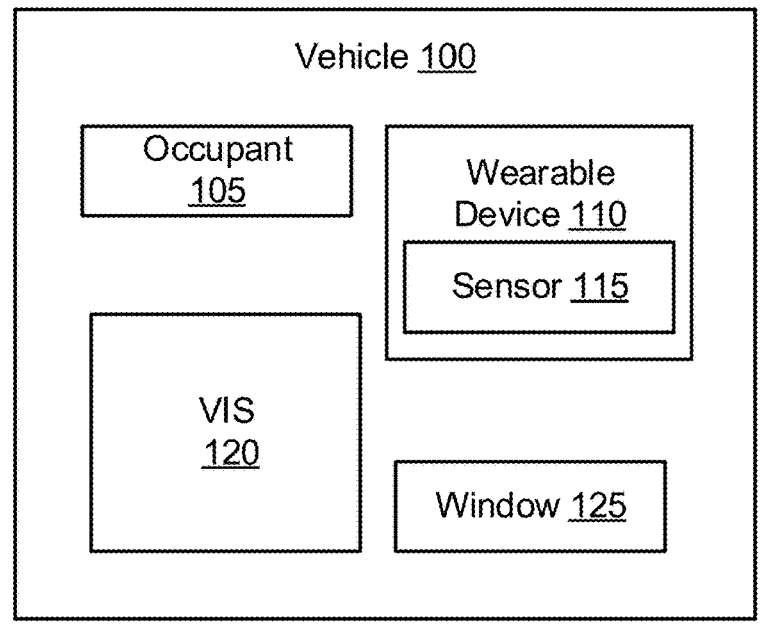
FIG. 1 shows an illustrative use case of a Vehicle Infotainment System (VIS) in accordance with some embodiments of the present disclosure.
Figure 1:
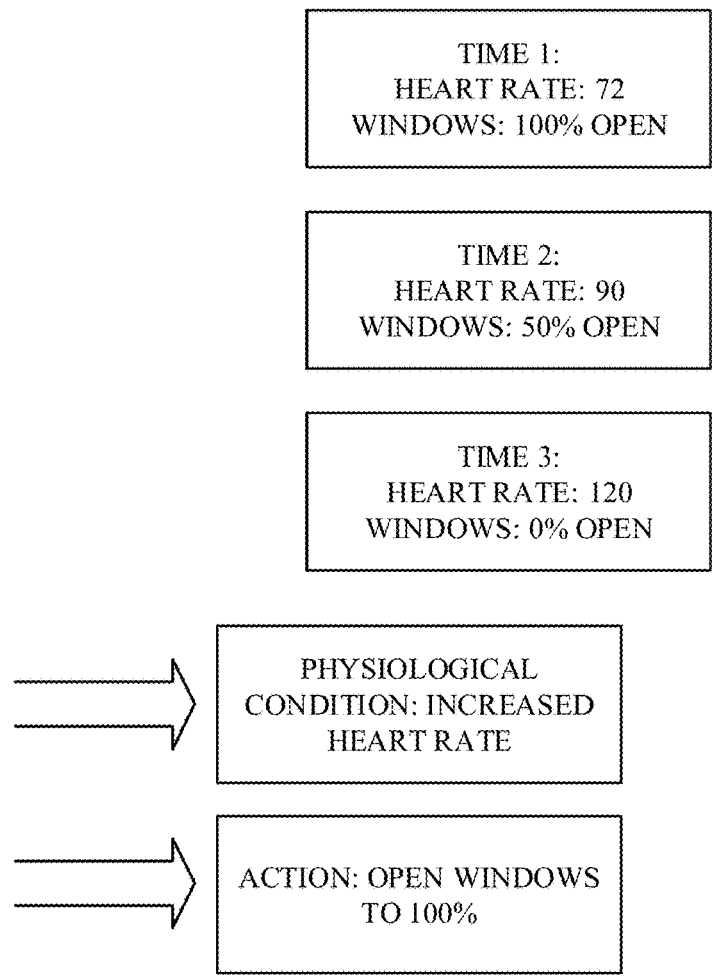

FIG. 1 shows an illustrative use case of a Vehicle Infotainment System (VIS) 120 in accordance with some embodiments of the present disclosure. In the illustrated embodiment, vehicle 100 includes occupant 105, wearable device 110, VIS 120, and window 125. Wearable device 110 may be, for example, a healthband (e.g., FitBit®), smart clothing, smartwatch, chest strap, any other suitable wearable device or any combination thereof. In the illustrated embodiment, wearable device 110 includes sensor 115. Sensor 115 may include an impedance sensor (e.g., electrocardiogram sensor), a pulse oximetry sensor, a blood pressure sensor, moisture sensor, respiration sensor, any other suitable sensor, or any combination thereof. VIS 120 is an example of, or includes aspects of, the corresponding element described with reference to FIGS. 2 and 3. For purposes of illustration, window 125 is being shown as part of vehicle 100. In some embodiments, vehicle 100 may also include one or more computing devices, cameras, accelerometers, gyroscopes, infrared sensors, or other sensors configured to monitor occupant 105. Alternatively or additionally, VIS 120 may communicate with a device carried by occupant 105 other than wearable device 110, such as a smartphone. Any of these sensors or devices may be configured to detect conditions of occupant 105 such as being asleep, experiencing a seizure, being agitated, changes in respiration, changes in body temperature, and the like.

In accordance with the present disclosure, VIS 120 detects the presence of occupant 105 in vehicle 100 and is able to communicate with wearable device 110 in order to receive physiological information generated by sensor 115. For example, VIS 120 may establish wireless communications with wearable device 110 using any suitable protocol such as Bluetooth, NFC, wifi, a mobile communications protocol, any other suitable wireless communications protocol and network, or any combination thereof. Values of one or more physiological parameters can be communicated from wearable device 110 to VIS 120 by way of the wireless communications based on physiological data provided by sensor 115. In one suitable approach, the presence of occupant 105 can be detected upon detecting the presence of wearable device 110 by VIS 120 using any suitable handshake or detection protocol or technique.

As illustrated in FIG. 1, at time 1, wearable device 110 can communicate to VIS 120 that the occupant has a heart rate of 72 (e.g., sensor 115 includes a pulse oximeter that provides oxygen saturation and heart rate values of occupant 105). Also at time 1, VIS 120 determines and records in, for example, a profile associated with occupant 105, that window 125 is 100% open. At time 2, occurring later than time 1, VIS 120 determines from wearable device 110 that the heart rate of occupant 105 is 90 and that window 125 is 50% open. At time 3, occurring later than time 2, VIS 120 determines from wearable device 110 that the heart rate of occupant 105 is 120 and that window 125 is 0% open (i.e., window 125 is closed). VIS 120 processes this data to determine a correlation exists between the heart rate of occupant 105 and the degree that window 125 is open. In particular, VIS 120 determines that the correlation is that the heart rate is lower the more open window 125 is. At time 3, VIS 120 detects a physiological condition associated with occupant 105. For example, VIS 120 determines that occupant 105 is suffering from an increased heart rate. This determination may be made based on predefined criteria for particular physiological conditions that are compared to the physiological parameters being collected for occupant 105 (e.g., a pulse rate above 110 for occupant 105 can be defined as being an increased heart rate condition).

In response to detecting the physiological condition of increased heart rate for occupant 105, VIS 120 causes an action to be performed in an attempt to mitigate the severity of the detected condition. In this case, because VIS 120 has determined a correlation to exist between how open window 125 is with respect to the heart rate of occupant 105, VIS causes window 125 to open to 100% in an attempt to bring the heart rate of occupant 105 down and therefore address the detected physiological condition.

In some embodiments, VIS 120 determines that window 125 (i.e., the window with which the heart rate of occupant 105 is correlated) is the window closest to occupant 105 and uses this information in determining the existence of the correlation.

Figure 2:
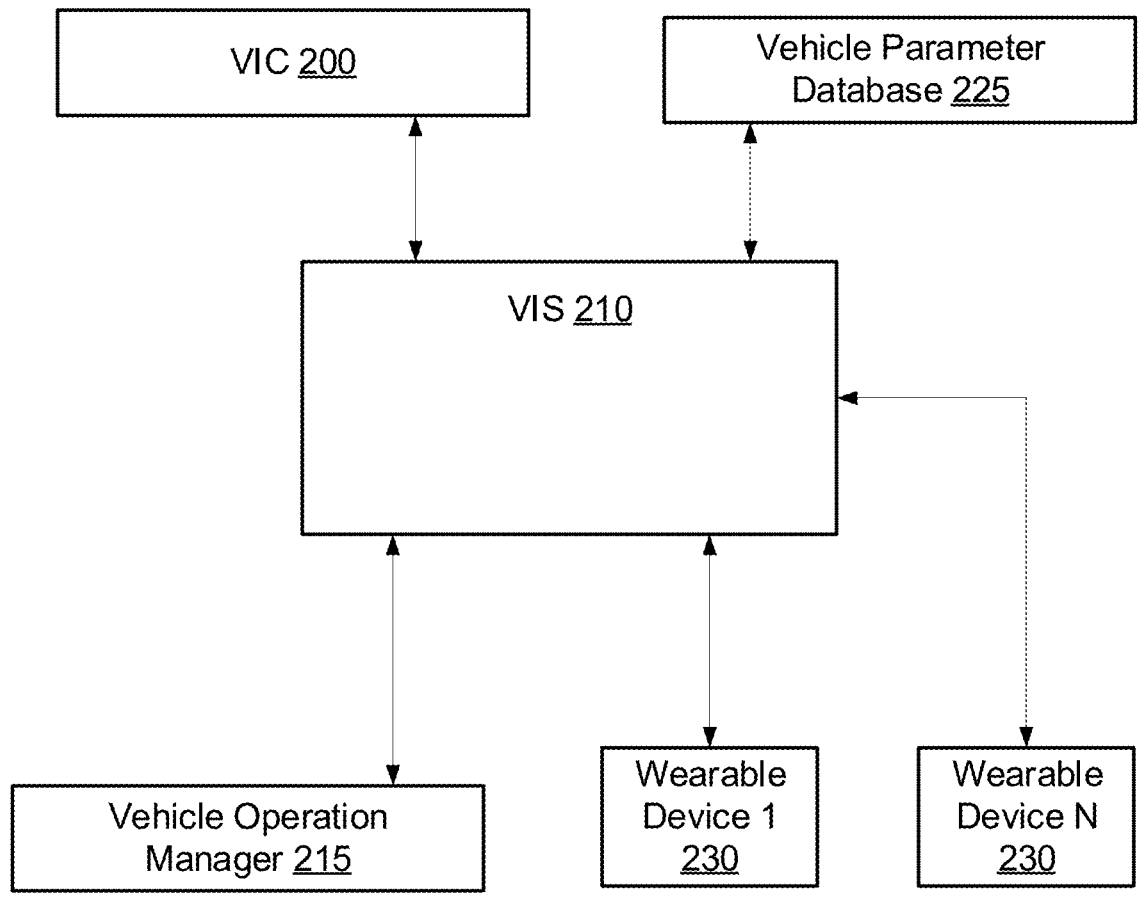
FIG. 2 shows an illustrative block diagram of a system including a VIS in accordance with some embodiments of the present disclosure.

FIG. 2 shows an illustrative block diagram of a system including a VIS in accordance with some embodiments of the present disclosure. The example shown includes vehicle infotainment cloud services (VIC) 200, vehicle operation manager 215, vehicle parameter database 225, and wearable user devices 1 . . . . N 230.

VIC 200 includes any suitable software, hardware, or both for providing VIS 210 with cloud services. For example, VIC 200 can be used to store at least some of the occupant profiles associated with occupants of the vehicle (e.g., vehicle 100). In some embodiments, profiles are associated with respective wearable devices 230, which themselves can be associated with respective occupants. Profiles stored by VIC 200 can include physiological information about an occupant. The physiological information can include historical physiological information (i.e., from before the occupant entered the vehicle), including for example, information about the occupant's health (e.g., pre-existing conditions, medication information, information about doctors, emergency contact information, treatment plans for physiological conditions, information about correlations previously made regarding the occupant's physiological parameter or conditions and operating parameters of the vehicle, historical physiological parameter values and trends, any other suitable physiological information, or any combination thereof). The physiological information can include physiological parameter values that have been measured during a current trip by a wearable device 230 and any physiological conditions detected during the current trip. VIC 200 can also store information about correlations between an occupant's physiological parameters and conditions and operating parameters of the vehicle. VIC 200 can also, in some embodiments, collect and store information related the profiles of occupants of other vehicles that can be used for example, for data analytics or otherwise directly leveraged for the benefit of a particular occupant (e.g., with similar pre-existing physiological conditions).

VIS 210 can communicate with VIC 200 using, for example, a mobile telecommunications network (e.g., 4G, 5G), any other suitable long-range communications network, or any combination thereof. Wearable devices 230 can communicate with VIS 210 with respective wireless or wired connections. For example, wearable devices 230 can communicate with VIS 210 using Bluetooth, NRC, wifi, a mobile telecommunication network, any other suitable wireless communication network or protocol, or any combination thereof. In some embodiments, wearable device 230 can communicate with each other using, for example, a wireless protocol.

Vehicle parameter database 225 can be at least partially located with the vehicle. In some embodiments, vehicle parameter database can be included in VIC 200. Vehicle parameter database includes information about the vehicle operating parameters. Vehicle operating parameters include any suitable operating parameters of a vehicle such as parameters related to the physical operation of the vehicle (e.g., engine operating parameters, transmission parameters, fluid levels, battery parameters, braking parameters, suspensions parameters, fuel parameters, any other suitable physical operation parameter, or any combination thereof), parameters related to environmental conditions within the vehicle cabin or storage locations (e.g., temperature parameters, including air conditioning parameters, window and door parameters, seat adjustment parameters, any other suitable parameters, or any combination thereof), parameters related to driving the vehicle (e.g., driving modes (e.g., sports, comfort) parameters, autonomous driving parameters, navigation parameters, any other suitable driving parameter, or any combination thereof), parameters related to mirrors, parameters related to the entertainment system (e.g., volume, content, speaker balance, any other suitable entertainment system parameters, or any combination thereof), any other suitable vehicle operating parameters, or any combination thereof.

VIS 210 analyzes physiological information and vehicle operating parameters to determine if there are correlations between them. For example, VIS 210 can use a trained machine learning model, suitable data analytics techniques, any other suitable technique, or any combination thereof to detect correlations.

Vehicle operation manager 215 is any suitable hardware, software, or both that is used by VIS 210 to cause an action to occur, for example, in response to detecting a physiological condition of an occupant. Vehicle operation manager 215 can be part of VIS 210. Vehicle operation manager can be located at least partially within the vehicle, at least partially remote from the vehicle (e.g., in VIC 200), or both. Vehicle operation manager 215 can be used to control any suitable aspects of the vehicle such as to affect an operating parameter of the vehicle. For example, vehicle operating manager 215 can control aspects of how the vehicle is driving (e.g., driving modes), aspects of autonomous driving (e.g., destinations, manner of driving, etc.), aspects of the environment in the cabin (e.g., temperature control, window control), communications to and from the vehicle (e.g., text messaging, telephone calls, emergency beacons), any other suitable aspects, or any combination thereof. To the extent possible, vehicle operation manager can be used by VIS 210 to control vehicle operating parameters directly. For example, causing windows to be closed or opened can be controlled directly by vehicle operation manager 215. VIS 210 can use vehicle operation manager 215 to control vehicle operating parameters indirectly. For example, if VIS 210 determines that the cabin temperature must be decreased, it can send appropriate commands to vehicle operation manager 215 to, among other things, avoid taking routes in direct sunlight.

According to some embodiments, VIS 210 receives, from at least a sensor operatively coupled to the occupant, information about a physiological parameter of the occupant. In some examples, VIS 210 determines, using processing circuitry 205, information about the operating parameter of the vehicle. In some examples, VIS 210 detects, using the processing circuitry 205, the physiological condition of the occupant based on the information about the physiological parameter of the occupant. In some examples, VIS 210 determines, in response to the detecting the physiological condition, a correlation between the operating parameter of the vehicle and the physiological condition of the occupant. In some examples, VIS 210 causes, using the processing circuitry 205, the action in the vehicle to be performed to address the physiological condition based on the determined correlation.

In some examples, VIS 210 causes to be measured, a first value of the physiological parameter of the occupant at a first time. In some examples, VIS 210 causes to be measured, a second value of the physiological parameter of the occupant at a second time, subsequent to the first time. In some examples, VIS 210 determines a first value of the operating parameter of the vehicle at the first time. In some examples, VIS 210 determines a second value of the operating parameter of the vehicle at the second time. In some examples, VIS 210 detects the physiological condition of the occupant based on the second value of the physiological parameter. In some examples, VIS 210 analyzes the first value of the physiological parameter and the second value of the physiological parameter with respect to the first value of the operating parameter and the second value of the operating parameter, where determining the correlation between the operating parameter of the vehicle and the physiological condition of the occupant is based on the analyzing. In some examples, VIS 210 detects the physiological condition of the occupant based on a difference between the first value of the physiological parameter and the second value of the physiological parameter.

In some examples, VIS 210 uses a trained machine learning model to determine the correlation between the operating parameter of the vehicle and the physiological condition of the occupant. In some examples, VIS 210 detects the physiological condition of the occupant further based on a profile associated with the occupant of the vehicle, where the profile includes physiological information about the occupant of the vehicle. In some examples, VIS 210 detects the presence of the occupant within the vehicle by detecting a signal from a wearable device including the sensor being worn by the occupant. In some examples, VIS 210 causes the operating parameter of the vehicle to be modified directly, indirectly, or both.

According to some embodiments, vehicle operation manager 215 causes the vehicle to seek medical assistance. In some examples, vehicle operation manager 215 causes the vehicle to be assisted in driving to the medical assistance.

Figure 3:
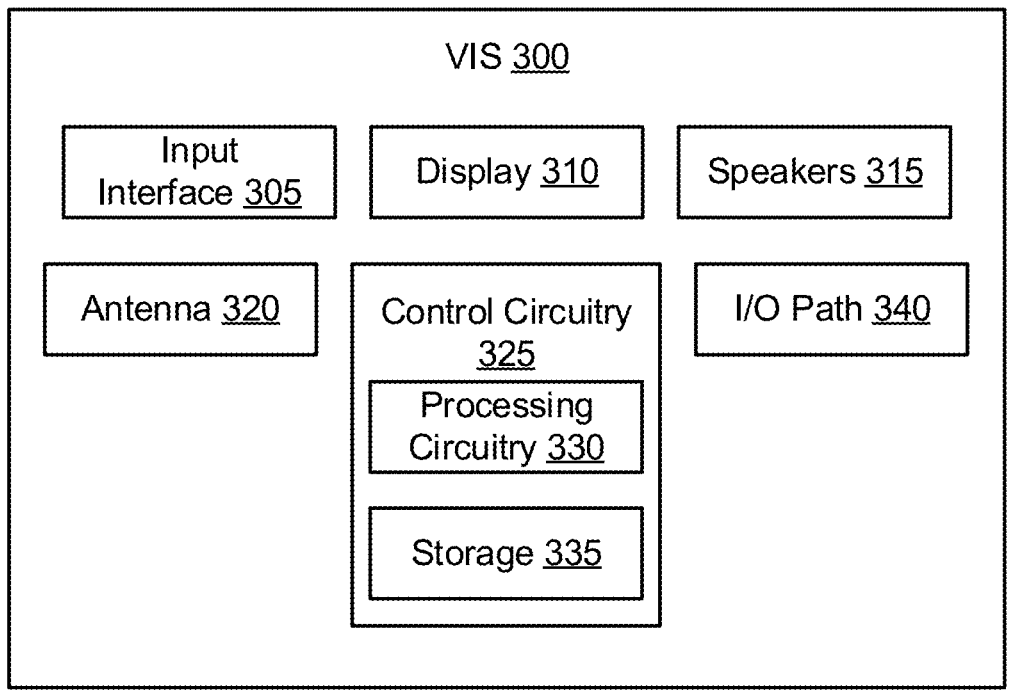
FIG. 3 shows an illustrative block diagram of an illustrative VIS in accordance with some embodiments of the present disclosure.

FIG. 3 shows an illustrative block diagram of an illustrative VIS 300 in accordance with some embodiments of the present disclosure. A user or occupant in a vehicle may interact with VIS from one or more of their wearable devices. FIG. 3 shows a generalized embodiment of illustrative VIS 300. More specific implementations of VIS 300 are discussed above. VIS 300 may receive content and data via I/O path 340. I/O path 340 may provide information and commands (e.g., available over a local area network (LAN), wide area network (WAN), Bluetooth, NFC, mobile communications network, any other suitable network, protocol or communications channel, or any combination thereof) and data to control circuitry 325, which includes processing circuitry 330 and storage 335. Control circuitry 325 may be used to send and receive commands, requests, physiological information, vehicle operating parameters, and other suitable data using I/O path 340.

Control circuitry 325 may be based on any suitable processing circuitry such as processing circuitry 330. As referred to herein, processing circuitry 330 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiment, processing circuitry can include any additional suitable hardware, software, or both, for implementing the functionality and features of VIS 300. In some embodiments, processing circuitry 330 may be distributed across multiple separate processors or processing units. In some embodiments, processing circuitry 330 executes instructions for software implementing at least some features and functions of VIS as described herein, which is stored in memory (i.e., storage 335). Specifically, processing circuitry 330 may be instructed by the VIS to perform the functions discussed above and below. For example, the VIS software may provide instructions to control circuitry 325 or processing circuitry 330 to generate the audio content display. In some implementations, any action performed by control circuitry 325 or processing circuitry 330 may be based on instructions received from the VIS software.

In client/server-based embodiments, control circuitry 325 may include communications circuitry suitable for communicating with a content application server or other networks or servers (e.g., a VIC). The instructions for carrying out the above-mentioned functionality may be stored on the content application server. Communications circuitry may include a cable modem, an integrated-services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In some embodiments, an antenna 320 is provided in the VIS 300 to communicate over a mobile communications network (e.g., using 4G or 5G protocols). In some embodiments, VIS 300 can use an occupant's mobile device as a hotpot to access remote servers over the Internet. In addition, communications circuitry may include circuitry that enables peer-to-peer communication of VIS 300 with other VIS's, or communication of VIS's in locations remote from each other.

Memory may be an electronic storage device provided as storage 335 that is part of control circuitry 325. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 335 may be used to store various types of content described herein as well as content data and content application data that are described above. Nonvolatile memory may also be used (e.g., to launch a boot-up routine and other instructions). Cloud-based storage (e.g., VIC) may be used to supplement storage 335 or instead of storage 335.

Control circuitry 325 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage 335) may also be provided. Control circuitry 325 may also include scaler circuitry for upconverting and down-converting content into the preferred output format of the VIS 300. Control Circuitry 325 may also include digital-to-analog converter circuitry and analog-to-digital converter circuitry for converting between digital and analog signals. The tuning and encoding circuitry may be used by the VIS 300 to receive and to display 310, play, or record content. In some embodiments, the control circuitry 325 may include an HD antenna 320.

In one embodiment, speakers 315 may be provided as integrated with other elements of VIS 300 or may be stand-alone units. The audio and other content displayed on display 310 may be played through speakers 315. In some embodiments, the audio may be distributed to a receiver (not shown), which processes and outputs the audio via speakers 315.

In some embodiments, one or more sensor signals is provided by one or more sensors to the VIS 300. A sensor may be used to monitor, identify, and determine vehicle status data, including vehicle operating parameters. For example, the VIS may receive vehicle status data from the sensor or any other vehicle status data (e.g., global positioning data of the vehicle, driving condition of the vehicle, etc.) received from any other vehicular circuitry and/or component that describes the status of the vehicle.

The software of VIS 300 may be implemented using any suitable architecture. For example, it may be a stand-alone application wholly implemented on VIS 300. In such an approach, instructions of the application are stored locally (e.g., in storage 335), and data for use by the application is downloaded on a periodic basis (e.g., from an out-of-band feed, from an Internet resource, or using another suitable approach). Control circuitry 325 may retrieve instructions of the application from storage 335 and process the instructions to generate any of the displays 310 discussed herein. Based on the processed instructions, control circuitry 325 may determine what action to perform when input is received from input interface 305. For example, the movement of a cursor on an audio user interface element may be indicated by the processed instructions when input interface 305 indicates that a user interface was selected.

In some embodiments, the VIS software is a client/server-based application. Data for use by a thick or thin client implemented on VIS 300 is retrieved on-demand by issuing requests to a server remote to the VIS 300. In one example of a client/server-based content application, control circuitry 325 runs a web browser that interprets web pages provided by a remote server. For example, the remote server may store the instructions for the application in a storage 335 device. The remote server may process the stored instructions using circuitry (e.g., control circuitry 325) and generate the displays discussed above and below. The client device may receive the displays generated by the remote server and may display the content of the displays locally on VIS 300. This way, the processing of the instructions is performed remotely by the server while the resulting displays are provided locally on VIS 300. VIS 300 may receive inputs from the user or occupant of the vehicle via input interface 305 and transmit those inputs to the remote server for processing and generating the corresponding displays. For example, VIS 300 may transmit, via antenna 320, communication to the remote server, indicating that a user interface element was selected via input interface 305. The remote server may process instructions in accordance with that input and generate a display of content identifiers associated with the selected user interface element. The generated display is then transmitted to VIS 300 for presentation to the user or occupant of the vehicle.

In some embodiments, the vehicle content interface application is downloaded and interpreted or otherwise run by an interpreter or virtual machine (run by control circuitry 325). In some embodiments, the VIS software may be encoded in the ETV Binary Interchange Format (EBIF), received by control circuitry 325 as part of a suitable feed, and interpreted by a user agent running on control circuitry 325. For example, the VIS software may be an EBIF application. In some embodiments, the VIS software may be defined by a series of JAVA-based files that are received and run by a local virtual machine or other suitable middleware executed by control circuitry 325. In some of such embodiments (e.g., those employing MPEG-2 or other digital media encoding schemes), the VIS software may be, for example, encoded and transmitted in an MPEG-2 object carousel with the MPEG audio of a program.

It will be understood that reference to control circuitry 325 and processing circuitry 330 can be made interchangeably to the extent the circuitry for executing features and functionalities of the present disclosure is being discussed. It will be further understood that VIS 120 (FIG. 1) and VIS 210 (FIG. 2) are examples of VIS 300.

Figure 4:
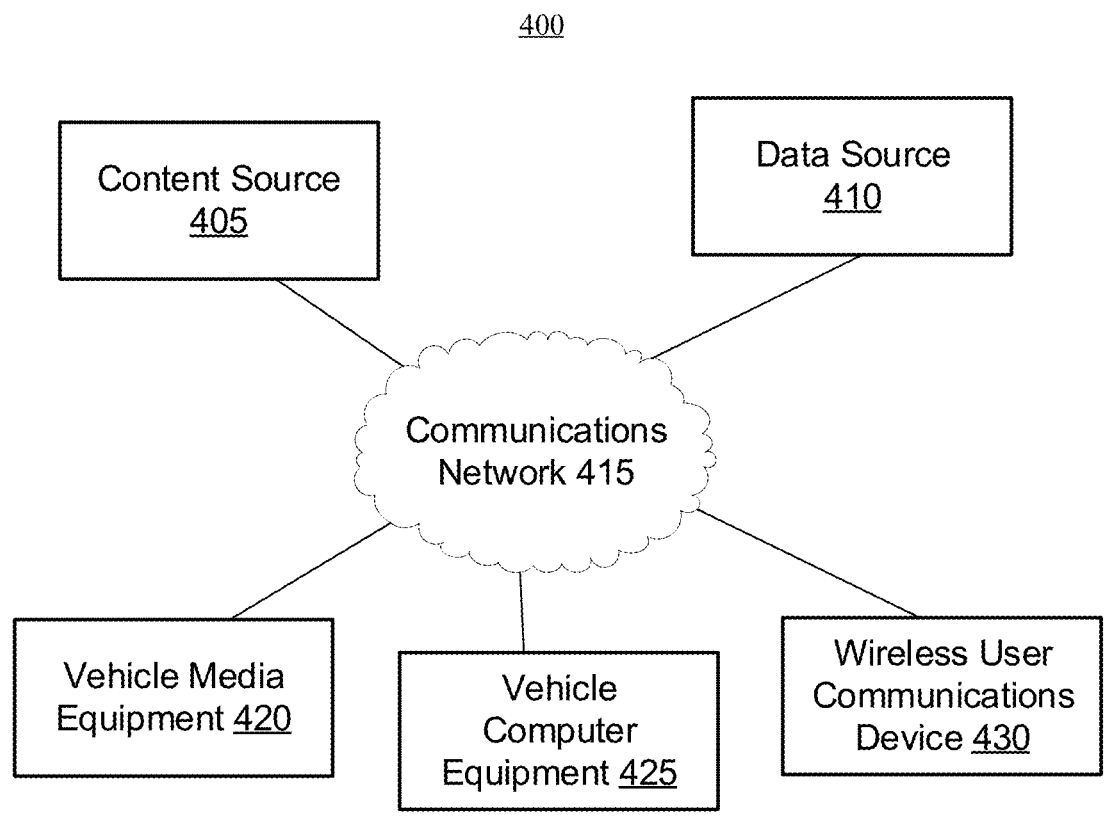
FIG. 4 shows a block diagram of a system implementing the features of the present disclosure.

VIS 300 of FIG. 3 can be implemented in the system of FIG. 4 as vehicle media equipment, vehicle computer equipment, wireless user communications device or any other type of user equipment suitable for accessing content. For simplicity, these devices may be referred to herein collectively as user equipment or VIS 300 and may be substantially similar to VIS 300 described above. VIS 300, including software implemented thereon, may function as stand-alone devices or may be part of a network of devices. Various network configurations of devices may be implemented and are discussed in more detail below.

FIG. 4 shows a block diagram of a system implementing the features of the present disclosure. A VIS utilizing at least some of the system features described above in connection with FIG. 4 need not be classified solely as vehicle media equipment 420, vehicle computer equipment 425, or a wireless user communications device 430. For example, vehicle media equipment 420 may, like some vehicle computer equipment 425, be Internet-enabled, allowing for access to Internet content, while wireless user computer equipment (e.g., wireless user communications device 430) may, like some vehicle media equipment 420, include a tuner allowing for access to media programming. The VIS graphical user interface may have the same layout on various types of vehicle equipment or may be tailored to the display capabilities of the vehicle equipment. For example, on wireless vehicle computer equipment (e.g., wireless user communications device 430), the VIS interface may be provided as a website accessed by a web browser. In another example, the VIS interface may be scaled down for wireless user communications devices 430.

The VIS may be coupled to communications network 415. Communications network 415 may be one or more networks including the Internet, a mobile phone network, mobile voice or data network (e.g., a 4G, 5G or LTE network), cable network, public switched telephone network, or other types of communications network 415 or combinations of communications networks 415.

System 400 includes content source 405 (e.g., providing data about other vehicles and other occupants) and data source 410 (e.g., providing profile data about the occupants in the vehicle) coupled to communications network 415. Content source 405 and data source 410 may include data stored in the same location, in different locations, or both as part of a VIC. Communications with the content source 405 and the data source 410 may be exchanged over one or more communications paths but are shown as a single path in FIG. 4 to avoid overcomplicating the drawing. Although communications between the content source 405 and the data source 410 with VIS (vehicle media equipment 420, vehicle computer equipment 425, wireless user communications device 430) are shown through communications network 415, in some embodiments, the content source 405 and the data source 410 may communicate directly with VIS (vehicle media equipment 420, vehicle computer equipment 425, wireless user communications device 430).

Physiological information and vehicle operating parameter data may be provided to the VIS using any suitable approach. In some embodiments, data from data source 410 and content source 405 may be provided to the VIS using a client/server approach. For example, a VIS may pull content data from a server, or a server may present the content data to a VIS. Data source 410 may provide VIS (vehicle media equipment 420, vehicle computer equipment 425, wireless user communications device 430) the VIS software, itself, or software updates for the VIS.

In one embodiment, system 400 includes content source 405, data source 410, communications network 415, vehicle media equipment 420, vehicle computer equipment 425, and wireless user communications device 430.

In some embodiments, the VIS (e.g., as illustrated in FIGS. 1-3) can create a profile for each occupant (or access a pre-existing profile for those occupants that already have profiles). The VIS can monitor one or more physiological parameters from each occupant using one or more physiological sensors being worn by the occupant using one or more wearable devices. The VIS may also monitor physiological parameters from each occupant using one or more sensors within the vehicle, such as cameras, accelerometers, gyroscopes, infrared sensors, or any other suitable sensors configured to monitor occupants of the vehicle. The VIS may, alternatively or additionally, monitor occupants of the vehicle using devices carried by each occupant other than wearable devices, such as a smartphone. The VIS can simultaneously monitor operating parameters of the vehicle. The following are illustrative inputs the VIS can receive from the vehicle and from the occupants' wearable devices.

In some embodiments, the VIS operates in several modes such as driver-only mode, and multi-passenger mode. The mode is determined by detecting the presence of passengers as well as their locations within the vehicle. For example, a weight on a seat that exceeds a predetermined threshold can be used to make such determination. In another example, a weight on a seat that is within a predetermined range can be used to make a determination that a child is at a particular location within the car. Similarly, the VIS will determine whether any of the there is a child/baby car seat attached to a seat (e.g., in the back of the vehicle). The presence of a baby in a car seat is one parameter that will be used by the VIS to make adjustments and optimizations. For example, if the VIS detects that all occupants have exited the vehicle with the exception of a child or baby in a car seat, the VIS can cause an appropriate action to be taken to protect the well-being of the child or baby (e.g., a text message is sent to the parents, the vehicle's horn is honked to alert the occupants that have just exited the vehicle).

In some embodiments, the VIS relies on wearable devices such as smart watches (e.g. Apple Watch) to, for example, periodically collect vital signs, such as temperature, respiration rate, heart/pulse rate of the occupants in order to modify operation of the vehicle for the benefit of one or more of the occupants. Modifications can include taking a different route to the destination, determining which window(s) or sunroof to completely open or "crack open," adjusting the speed of the fan, temperature settings of the air conditioning, including setting the air conditioner to recirculate, any other suitable modifications to the operation of the vehicle, or any combination thereof.

In some embodiments, the VIS intelligently creates or builds "health profiles" for each occupant as well as "passenger types" as it collects data in real-time and enhances the profiles (e.g., while offline) by using data collected about the occupants over time, and by also communicating with a server-based service (e.g., VIC) that includes anonymous data collected from other vehicles in the same geographic location (e.g., county or city/state), or other states/countries. In some embodiments, an existing health profile of an occupant is used (e.g., if it can be retrieved from a smart watch) or a smart phone (e.g., iOS health application). Health data can be collected or polled automatically from the passenger wearable devices (e.g., via Bluetooth) or even shared manually by the passengers (e.g., by tapping the wristwatch on tags embedded in the vehicle, such as on the back of the headrest or elsewhere). This can be used to, for example, assign passengers to different locations or zones in the vehicle. A similar process takes places in case the vehicle stops and only some occupants exit (e.g., go to a convenience store) and then get back in. The VIS ensures that the occupants did not switch seats, and if they did, runs a remapping algorithm to associate seats with occupants.

In some embodiments, when the trip begins (i.e., vehicle is in drive-mode), an initialization process is executed to get the state of various accessories of the vehicle (e.g., windows, air conditions, determining number of passengers and their locations within the vehicle, whether a car seat is present, and whether an infant is sitting inside the car seat, any other suitable states, or any combination thereof). Changes to the states of various parts of the vehicle can take place then based on whether there are existing health profiles for the occupants as well as other factors, such as weather information (e.g., humidity). After a predetermined time during the trip, the VIS can poll data from the wearable devices to identify changes in the occupants' physiological parameters (e.g., temperature, heart rate, determine whether a passenger is sweating, etc.). Similarly, any of the wearable devices can automatically notify the VIS of a significant change in one or more of an occupant's physiological parameters (e.g., sudden drop of heart rate). The VIS might determine that only one of the occupants (e.g., occupant 4 sitting behind the driver's seat has an above normal temperature, in which case the air conditioning can be adjusted for that particular zone of the car. At this point, occupant 4 becomes the priority, and occupant 4's physiological parameter data is consistently monitored to determine whether the previous action resulted in bringing the temperature down to normal body temperature. In some embodiments, the VIS determines to open a window in this situation, and also determines which window to open relative to occupant 4 and how much to open the window. These determinations may be based, for example, on the direction of the wind, speed of the car, any other suitable criterion, or any combination thereof. The VIS may further make such determination based on physiological information collected from the other occupants, including whether there is a car seat and whether there is an infant in the car seat, since the infant is unlikely to be wearing a Fitbit or an Apple Watch. Some physiological information could be collected about the infant, however. For example, a strap on the infant's car seat can include a sensor for measuring the infant's heart rate and other sensors can be used to measure movement and other physiological parameters of the infant.

In some embodiments, the VIS may also be configured to switch a priority to a particular occupant based on physiological information of the particular occupant in addition to data that indicates the particular occupant is asleep or otherwise unresponsive, and/or that the particular occupant cannot communicate or access manual controls (e.g., infants/toddlers). For example, the VIS may determine that there is a child in a car seat, and that the child is asleep and has increasing temperature, heart rate, perspiration, and/or other physiological parameter values indicative of motion sickness. In response, the VIS may adjust the air conditioner, open/close windows, change to a smoother driving style, etc. to help make the child more comfortable.

In some embodiments, where multiple occupants are experiencing respective physiological conditions as determined by the VIS, and where actions that would normally be taken by the VIS in response to detecting those physiological conditions are in conflict with one another, the VIS may prioritize which actions to take based on a priority assigned to each respective occupant, to each respective physiological condition, or both. Other factors can also be taken into account in determining whether actions normally taken should be overridden by the VIS. For example, weather conditions can be used by the VIS to determine which actions are appropriate to take in different circumstance (e.g., don't open windows 100% when it is raining outside). Consideration such as security and occupant preferences can also be used to influence actions to be taken.

In some embodiments, the VIS can also poll for physiological information when the vehicle performs specific actions, such as sudden braking, wide turn, reduce speed for an upcoming red light stop, slow movement in heavy traffic, or when any of the tires hit a pothole, in order to update the health profiles of the occupants and optimize its operation. For example, the data might show that wide turns and/or hitting a pothole significantly raises the pulse rate of at least one occupant. In this case, the VIS can determine to query the navigation system for alternative routes. For example, an alternative route with no known wide turns or potholes can be used if switching to such route will not heavily impact the arrival time. The VIS can cause the vehicle to announce that it plans to take an alternative route that is free of potholes and an occupant can accept or reject such recommendation. In another example, an autonomous driving style or other driver assistance recommendations can be adjusted to provide a smoother ride for the comfort of occupants in the vehicle. In some approaches, occupants can always override decisions or reject recommendations that the VIS makes.

In some embodiments, the vehicle's navigation system can also assist the VIS. For example, physiological information about occupants from other vehicles can be collected (anonymously) and correlated with known landmarks. For example, such physiological information might show that 60% of the occupants on a specific uphill road experienced increase heart rate when the car stopped at the traffic light then began acceleration again (after the light turned green). In this case, the VIS might cause the vehicle to adjust its speed to avoid running into the red light at this particular landmark which will force the vehicle to stop and begin accelerating when the light turns back to green. Similarly, the health profiles might indicate similar discomfort that occur at stop signs, and therefore, the VIS can take that into account while driving. In some embodiments, the VIS causes the navigation system to determine the vehicle's route at the beginning of the trip based on existing health profiles of existing occupants. The VIS can cause the navigation system to adjust the route as more physiological information about the occupants becomes available during the course of the trip.

In some embodiments, the VIS, through the vehicle's navigation system, might learn about accidents that occur on specific roads/near specific landmarks and cause the navigation system to avoid such routes if possible. Additionally, the VIS can advise the driver or the other occupants that active supervision is needed during a specific time period (i.e., while the car is driving through the road). Navigation data from vehicles involved in "near-accident" situations or an actual accident can be collected and analyzed to determine whether the particular road (e.g., its geometry) is an issue.

In some embodiments, while physiological parameters can be monitored by the VIS on a periodic basis, the VIS can determine to requires physiological parameters from wearable devices before a scheduled transmission of physiological information from the wearable devices is supposed to take place. For example, if the VIS determines that there was a particular triggering change in a vehicle operating parameter, this can trigger the VIS to request physiological parameters to determine whether the change in the vehicle operating parameter caused a change in any physiological parameter. For example, the VIS might determine that the vehicle has entered a high-altitude region (e.g., using a vehicle's altimeter, terrain data stored in the vehicle's navigation system, GPS data, or any other suitable source of altitude information). The VIS can be programmed to use a significant change in altitude (or reaching an altitude of a threshold distance) as a trigger to request from any available wearable devices of all occupants in the vehicle physiological parameter data. The VIS can then check to see if the change in altitude caused a physiological condition in any of the occupants without having to wait for the next scheduled transmission of physiological information to the VIS.

In some embodiments, the VIS can take into account calendar data from an occupant's profile in determining actions to take. For example, the VIS can access an occupant's personal calendar (with the occupant's permission) to determine the occupant's schedule. This information can be used in case, for example, the VIS determines to change a current route to a particular destination in order to avoid having the occupant be late for a scheduled meeting.

In some embodiments, where a vehicle is being manually driven (i.e., without autonomous driving), the VIS may determine, based on detecting a physiological condition that likely impairs the driver's ability to drive the vehicle, to turn on autonomous driving mode (e.g., where the driver has lost consciousness). As another example, the VIS can determine from monitoring vehicle operating parameters, that the driver is weaving in traffic in dangerous patterns and, together with physiological parameter data (e.g., low blood pressure readings), determine that autonomous driving should be activated and cause that activation to occur.

Figure 5:
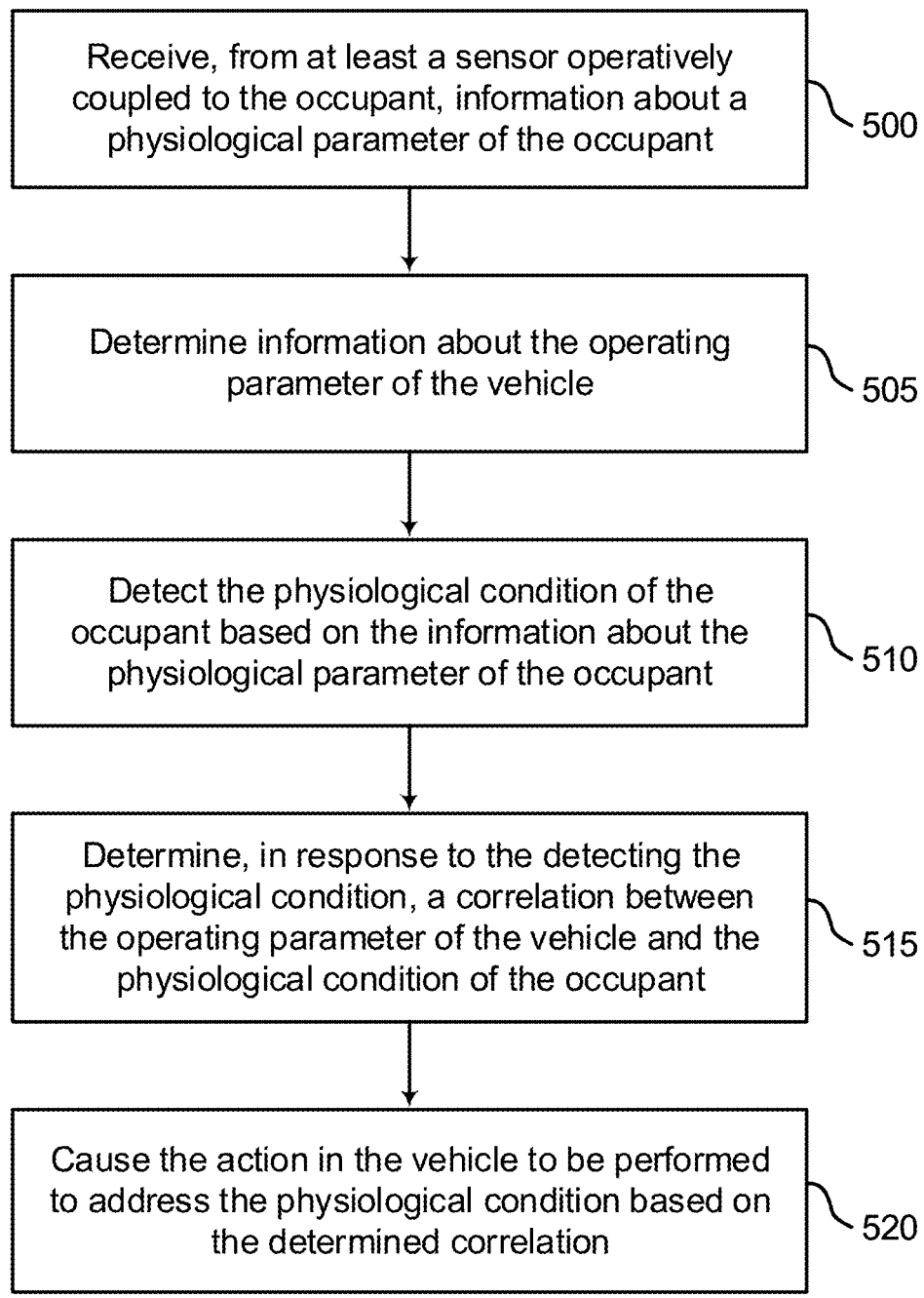
FIGS. 5 through 6 show examples of a process for correlating a physiological condition of an occupant of a vehicle to an operating parameter of the vehicle in order to perform an action to address the physiological condition according to aspects of the present disclosure.

FIG. 5 shows an example of a process for correlating a physiological condition of an occupant of a vehicle to an operating parameter of the vehicle in order to perform an action to address the physiological condition according to aspects of the present disclosure. In some examples, these operations are performed by a system including a processor executing a set of codes to control functional elements of an apparatus (e.g., processing circuitry 330). Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives, from at least a sensor operatively coupled to the occupant or otherwise configured to monitor the occupant, information about a physiological parameter of the occupant. In some cases, the operations of this step refer to, or may be performed by, a VIS as described with reference to FIG. 2.

At operation 505, the system determines, using processing circuitry, information about the operating parameter of the vehicle. In some cases, the operations of this step refer to, or may be performed by, a VIS as described with reference to FIGS. 2-4.

At operation 510, the system detects, using the processing circuitry, the physiological condition of the occupant based on the information about the physiological parameter of the occupant. In some cases, the operations of this step refer to, or may be performed by, a VIS as described with reference to FIGS. 2-4.

At operation 515, the system determines, in response to the detecting the physiological condition, a correlation between the operating parameter of the vehicle and the physiological condition of the occupant. In some cases, the operations of this step refer to, or may be performed by, a VIS as described with reference to FIGS. 2-4.

At operation 520, the system causes, using the processing circuitry, the action in the vehicle to be performed to address the physiological condition based on the determined correlation. In some cases, the operations of this step refer to, or may be performed by, a VIS as described with reference to FIGS. 2-4.

Figure 6:
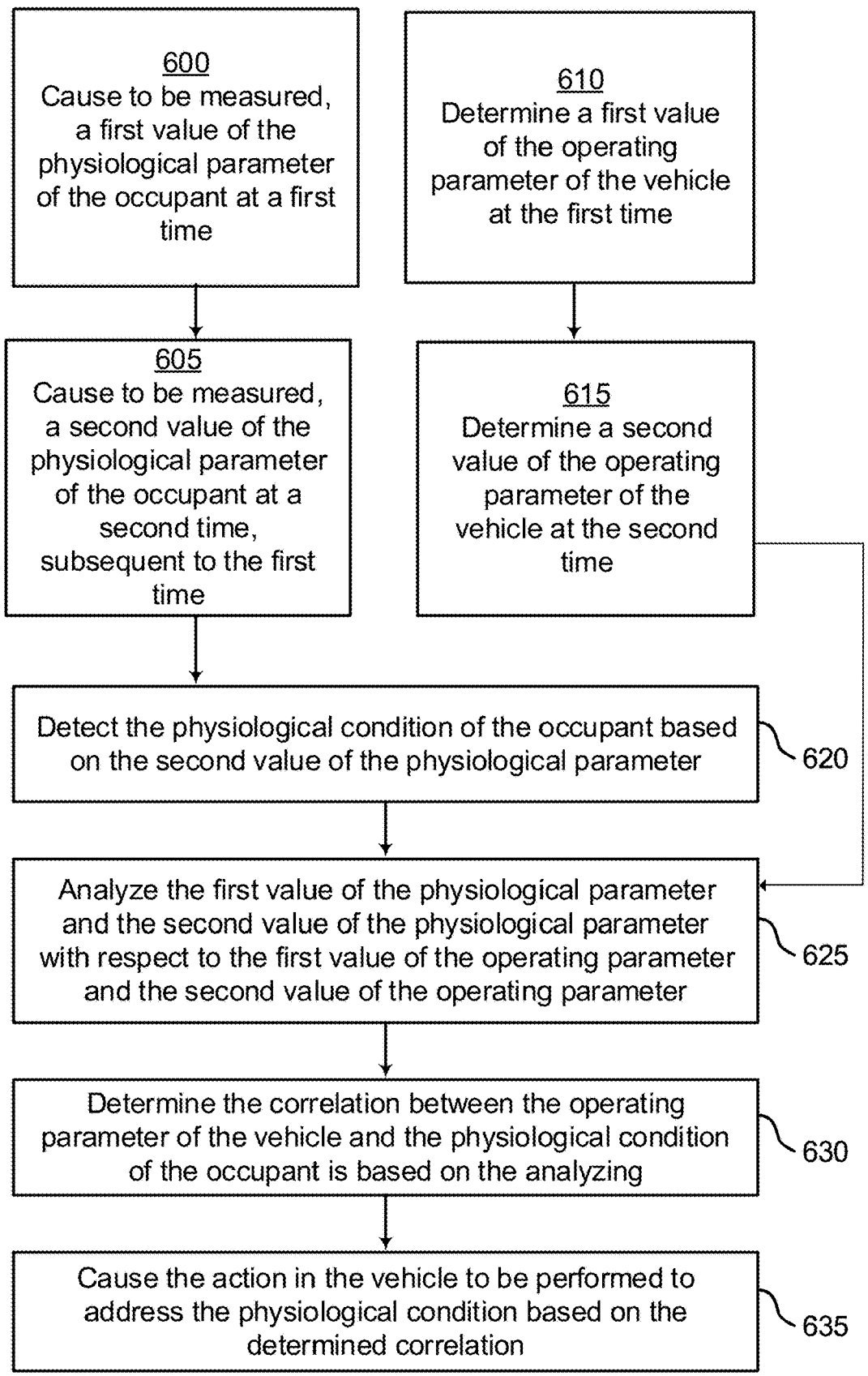

FIG. 6 shows an example of a process for correlating a physiological condition of an occupant of a vehicle to an operating parameter of the vehicle in order to perform an action to address the physiological condition according to aspects of the present disclosure. In some examples, these operations are performed by a system including a processor executing a set of codes to control functional elements of an apparatus (e.g., processing circuitry 330). Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system causes to be measured, a first value of the physiological parameter of the occupant at a first time. In some cases, the operations of this step refer to, or may be performed by, a VIS as described with reference to FIGS. 2-4.

At operation 605, the system causes to be measured, a second value of the physiological parameter of the occupant at a second time, subsequent to the first time. In some cases, the operations of this step refer to, or may be performed by, a VIS as described with reference to FIGS. 2-4.

At operation 610, the system determines a first value of the operating parameter of the vehicle at the first time. In some cases, the operations of this step refer to, or may be performed by, a VIS as described with reference to FIGS. 2-4.

At operation 615, the system determines a second value of the operating parameter of the vehicle at the second time. In some cases, the operations of this step refer to, or may be performed by, a VIS as described with reference to FIGS. 2-4.

At operation 620, the system detects the physiological condition of the occupant based on the second value of the physiological parameter. In some cases, the operations of this step refer to, or may be performed by, a VIS as described with reference to FIGS. 2-4.

At operation 625, the system analyzes the first value of the physiological parameter and the second value of the physiological parameter with respect to the first value of the operating parameter and the second value of the operating parameter. In some cases, the operations of this step refer to, or may be performed by, a VIS as described with reference to FIGS. 2-4.

At operation 630, the system determines the correlation between the operating parameter of the vehicle and the physiological condition of the occupant is based on the analyzing. In some cases, the operations of this step refer to, or may be performed by, a VIS as described with reference to FIGS. 2-4.

At operation 635, the system causes, using the processing circuitry, the action in the vehicle to be performed to address the physiological condition based on the determined correlation. In some cases, the operations of this step refer to, or may be performed by, a VIS as described with reference to FIGS. 2-4.

Accordingly, the present disclosure includes the following embodiments.

A method for correlating a physiological condition of an occupant of a vehicle to an operating parameter of the vehicle in order to perform an action to address the physiological condition is described. One or more embodiments of the method include receiving, from at least a sensor operatively coupled to the occupant, information about a physiological parameter of the occupant, determining, using processing circuitry, information about the operating parameter of the vehicle, detecting, using the processing circuitry, the physiological condition of the occupant based on the information about the physiological parameter of the occupant, determining, in response to the detecting the physiological condition, a correlation between the operating parameter of the vehicle and the physiological condition of the occupant, and causing, using the processing circuitry, the action in the vehicle to be performed to address the physiological condition based on the determined correlation.

A non-transitory computer readable medium storing code for correlating a physiological condition of an occupant of a vehicle to an operating parameter of the vehicle in order to perform an action to address the physiological condition is described. In some examples, the code comprises instructions executable by a processor to perform the steps of: receiving, from at least a sensor operatively coupled to the occupant, information about a physiological parameter of the occupant, determining, using processing circuitry, information about the operating parameter of the vehicle, detecting, using the processing circuitry, the physiological condition of the occupant based on the information about the physiological parameter of the occupant, determining, in response to the detecting the physiological condition, a correlation between the operating parameter of the vehicle and the physiological condition of the occupant, and causing, using the processing circuitry, the action in the vehicle to be performed to address the physiological condition based on the determined correlation.

A system for correlating a physiological condition of an occupant of a vehicle to an operating parameter of the vehicle in order to perform an action to address the physiological condition is described. One or more embodiments of the system include receiving, from at least a sensor operatively coupled to the occupant, information about a physiological parameter of the occupant, determining, using processing circuitry, information about the operating parameter of the vehicle, detecting, using the processing circuitry, the physiological condition of the occupant based on the information about the physiological parameter of the occupant, determining, in response to the detecting the physiological condition, a correlation between the operating parameter of the vehicle and the physiological condition of the occupant, and causing, using the processing circuitry, the action in the vehicle to be performed to address the physiological condition based on the determined correlation.

Some examples of the method, non-transitory computer readable medium, and system further include causing to be measured, a first value of the physiological parameter of the occupant at a first time. Some examples further include causing to be measured, a second value of the physiological parameter of the occupant at a second time, subsequent to the first time. Some examples of the method, non-transitory computer readable medium, and system further include determining a first value of the operating parameter of the vehicle at the first time. Some examples further include determining a second value of the operating parameter of the vehicle at the second time. Some examples of the method, non-transitory computer readable medium, and system further include detecting the physiological condition of the occupant based at least in part on the second value of the physiological parameter. Some examples of the method, non-transitory computer readable medium, and system further include analyzing the first value of the physiological parameter and the second value of the physiological parameter with respect to the first value of the operating parameter and the second value of the operating parameter, where determining the correlation between the operating parameter of the vehicle and the physiological condition of the occupant is based on the analyzing.

Some examples of the method, non-transitory computer readable medium, and system further include detecting the physiological condition of the occupant based on a difference between the first value of the physiological parameter and the second value of the physiological parameter.

Some examples of the method, non-transitory computer readable medium, and system further include using a trained machine learning model to determine the correlation between the operating parameter of the vehicle and the physiological condition of the occupant.

Some examples of the method, non-transitory computer readable medium, and system further include causing to be stored data indicative of the physiological information and data indicative of the physiological condition in a profile associated with the occupant of the vehicle.

Some examples of the method, non-transitory computer readable medium, and system further include detecting the physiological condition of the occupant further based on a profile associated with the occupant of the vehicle, wherein the profile comprises physiological information about the occupant of the vehicle.

Some examples of the method, non-transitory computer readable medium, and system further include detecting the presence of the occupant within the vehicle by detecting a signal from a wearable device comprising the sensor being worn by the occupant.

Some examples of the method, non-transitory computer readable medium, and system further include causing the operating parameter of the vehicle to be modified directly, indirectly, or both.

Some examples of the method, non-transitory computer readable medium, and system further include causing the vehicle to seek medical assistance.

Some examples of the method, non-transitory computer readable medium, and system further include causing the vehicle to be assisted in driving to the medical assistance.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

What is claimed is:

1. A method of correlating a physiological condition of an occupant of a vehicle to an operating parameter of the vehicle in order to perform an action to address the physiological condition, the method comprising:
   receiving, from at least a sensor operatively coupled to the occupant, information about a physiological parameter of the occupant;

determining, using processing circuitry, information about the operating parameter of the vehicle;

detecting, using the processing circuitry, the physiological condition of the occupant based on the information about the physiological parameter of the occupant;

retrieving, using the processing circuitry, aggregated physiological information from occupants of other vehicles and operating parameter information associated with the aggregated physiological information, wherein the aggregated physiological information indicates that the occupants of the other vehicles experienced physiological discomfort at a geographic location, and wherein the operating parameter information indicates that the other vehicles at the geographic location performed braking and acceleration at the geographic location when the physiological discomfort was being experienced by the occupants of the other vehicles at the geographic location; and based on determining that the vehicle is located at or is approaching the geographic location associated with the aggregated physiological information indicating the physiological discomfort of the other occupants of other vehicles at the geographic location, causing, using the processing circuitry, performance of the action to address the physiological condition by modifying at least one of speed, acceleration, or braking of the vehicle based on the indication in the operating parameter information that the other vehicles at the geographic location performed braking and acceleration at the geographic location when the physiological discomfort was being experienced by the occupants of the other vehicles at the geographic location.

2. The method of claim 1, wherein:

receiving information about the physiological parameter of the occupant comprises:
  causing to be measured, a first value of the physiological parameter of the occupant at a first time, and causing to be measured, a second value of the physiological parameter of the occupant at a second time, subsequent to the first time;

determining the information about the operating parameter of the vehicle comprises:
  determining a first value of the operating parameter of the vehicle at the first time, and
  determining a second value of the operating parameter of the vehicle at the second time;

detecting the physiological condition of the occupant comprises detecting the physiological condition based at least in part on the second value of the physiological parameter; and determining a correlation between the operating parameter of the vehicle and the physiological condition of the occupant by analyzing the first value of the physiological parameter and the second value of the physiological parameter with respect to the first value of the operating parameter and the second value of the operating parameter.

3. The method of claim 2, wherein detecting the physiological condition of the occupant comprises detecting the physiological condition based on a difference between the first value of the physiological parameter and the second value of the physiological parameter.

4. The method of claim 1, further comprising determining a correlation between the operating parameter of the vehicle and the physiological condition of the occupant comprises using a trained machine learning model to determine the correlation between the operating parameter of the vehicle and the physiological condition of the occupant.

5. The method of claim 1, further comprising:
causing data to be stored in association with a profile associated with the occupant of the vehicle, wherein the data is indicative of the physiological information and the physiological condition.

6. The method of claim 1, wherein detecting the physiological condition of the occupant comprises detecting the physiological condition of the occupant further based on a profile associated with the occupant of the vehicle, wherein the profile comprises physiological information about the occupant of the vehicle.

7. The method of claim 1, further comprising:
detecting the presence of the occupant within the vehicle by detecting a signal from a wearable device comprising the sensor being worn by the occupant.

8. The method of claim 1, wherein causing performance of the action comprises causing the operating parameter of the vehicle to be modified directly, indirectly, or both, wherein the operating parameter comprises at least one of the speed, acceleration, or braking of the vehicle.

9. The method of claim 1, wherein the method further comprises causing, based on the physiological condition of the occupant, the vehicle to navigate to a location that provides medical assistance.

10. The method of claim 1, wherein:
causing the performance of the action to address the physiological condition comprises automatically modifying the speed of the vehicle based on the indication in the operating parameter information that the other vehicles at the geographic location performed braking and acceleration at the geographic location when the physiological discomfort was being experienced by the occupants of the other vehicles at the geographic location.

11. The method of claim 10, wherein:
the braking was performed at the geographic location by the occupants of the other vehicles based on a traffic light providing a red light signal, and the acceleration was performed at the geographic location by the occupants of the other vehicles at the geographic location based on the traffic light transitioning to a green light signal; and performance of the action to address the physiological condition by automatically modifying the speed of the vehicle is performed to cause the speed of the vehicle to be set to reduce the likelihood of vehicle having to brake at the traffic light providing the red light signal and subsequently accelerate when the traffic light provides the green light signal.

12. The method of claim 1, wherein:
the vehicle has a plurality of occupants including the occupant;
the method further comprises:
  assigning each respective occupant of the plurality of occupants a respective priority based on one or more attributes of the respective occupant; and
  causing the performance of the action further based on determining that the occupant is assigned a highest priority as compared to the respective priorities of the other of the plurality of occupants.

13. A system for correlating a physiological condition of an occupant of a vehicle to an operating parameter of the vehicle in order to perform an action to address the physiological condition, the system comprising processing circuitry to:

receive, from at least a sensor operatively coupled to the occupant, information about a physiological parameter of the occupant;

determine information about the operating parameter of the vehicle;

detect the physiological condition of the occupant based on the information about the physiological parameter of the occupant;

retrieve aggregated physiological information from occupants of other vehicles and operating parameter information associated with the aggregated physiological information, wherein the aggregated physiological information indicates that the occupants of the other vehicles experienced physiological discomfort at a geographic location, and wherein the operating parameter information indicates that the other vehicles at the geographic location performed braking and acceleration at the geographic location when the physiological discomfort was being experienced by the occupants of the other vehicles at the geographic location;

based on determining that the vehicle is located at or is approaching the geographic location associated with the aggregated physiological information indicating the physiological discomfort of the other occupants of other vehicles at the geographic location, cause performance of the action to address the physiological condition by modifying at least one of speed, acceleration, or braking of the vehicle based on the indication in the operating parameter information that the other vehicles at the geographic location performed braking and acceleration at the geographic location when the physiological discomfort was being experienced by the occupants of the other vehicles at the geographic location.

14. The system of claim 13, wherein the processing circuitry is further configured to:
cause measurement of a first value of the physiological parameter of the occupant at a first time;
cause measurement of a second value of the physiological parameter of the occupant at a second time, subsequent to the first time;
determine a first value of the operating parameter of the vehicle at the first time;
determine a second value of the operating parameter of the vehicle at the second time;
detect the physiological condition based at least in part on the second value of the physiological parameter; and
analyze the first value of the physiological parameter and the second value of the physiological parameter with respect to the first value of the operating parameter and the second value of the operating parameter.

15. The system of claim 14, wherein the processing circuitry is further configured to detect the physiological condition based on a difference between the first value of the physiological parameter and the second value of the physiological parameter.

16. The system of claim 13, wherein the processing circuitry is further configured to use a trained machine learning model to determine a correlation between the operating parameter of the vehicle and the physiological condition of the occupant.

17. The system of claim 13, wherein:
the processing circuitry is further configured to cause data to be stored in association with a profile associated with the occupant of the vehicle, wherein the data is indicative of the physiological information and the physiological condition; and
the processing circuitry is configured to detect the physiological condition of the occupant further based on the profile.

18. The system of claim 13, the processing circuitry is further configured to detect the presence of the occupant within the vehicle by detecting a signal from a wearable device comprising the sensor being worn by the occupant.

19. The system of claim 13, wherein the processing circuitry is further configured to cause performance of the action by causing the operating parameter of the vehicle to be modified directly, indirectly, or both, wherein the operating parameter comprises at least one of the speed, acceleration, or braking of the vehicle.

20. The system of claim 13, wherein the processing circuitry is further configured to, based on the physiological condition of the occupant, cause the vehicle to navigate to a location that provides medical assistance.

* * * * *